US010175083B1

(12) United States Patent
Lopera et al.

(10) Patent No.: US 10,175,083 B1
(45) Date of Patent: Jan. 8, 2019

(54) VORTEX FLOWMETER HAVING INJECTION CLEANING PORTS

(71) Applicant: Schneider Electric Systems USA, Inc., Foxboro, MA (US)

(72) Inventors: Javier Lopera, Quincy, MA (US); Wayne A. Dessert, Rehobeth, MA (US); Lou Collins, Foxboro, MA (US)

(73) Assignee: Schneider Electric Systems USA, Inc., Foxboro, MA (US)

( * ) Notice: Subject to any disclaimer, the term of this patent is extended or adjusted under 35 U.S.C. 154(b) by 0 days.

(21) Appl. No.: 15/691,263

(22) Filed: Aug. 30, 2017

(51) Int. Cl.
*G01F 15/12* (2006.01)
*G01F 1/32* (2006.01)
*G01F 1/34* (2006.01)

(52) U.S. Cl.
CPC ............ *G01F 15/12* (2013.01); *G01F 1/3218* (2013.01); *G01F 1/3263* (2013.01); *G01F 1/34* (2013.01)

(58) Field of Classification Search
CPC ............... G01F 1/32; G01F 15/12; G01F 1/34
See application file for complete search history.

(56) References Cited

U.S. PATENT DOCUMENTS

| 9,016,138 | B2 * | 4/2015 | Brand | G01F 1/3218 73/861.22 |
| 9,046,395 | B2 * | 6/2015 | Pulley | G01F 1/3263 |
| 9,476,741 | B2 * | 10/2016 | Hollmach | G01F 25/0007 |
| 2014/0202234 | A1 * | 7/2014 | Burgon | G01N 21/15 73/31.07 |
| 2015/0323356 | A1 * | 11/2015 | Brosnihan | G01F 1/3218 73/861.24 |
| 2017/0058635 | A1 * | 3/2017 | Downing | E21B 43/127 |

* cited by examiner

*Primary Examiner* — Jewel V Dowtin
(74) *Attorney, Agent, or Firm* — Stinson Leonard Street LLP

(57) ABSTRACT

A vortex flowmeter for measuring a flow rate of a fluid has a flowtube and a bluff body positioned in the flowtube for shedding vortices in the fluid when the fluid flows through the flowtube. A sensor is positioned to detect the vortices. A cleaning port is positioned to allow a stream of fluid to be directed into the flowtube through the cleaning port toward the sensor for cleaning material away from the sensor. A method of cleaning the vortex flowmeter includes injecting a fluid into the vortex flowmeter toward the sensor through the cleaning port.

20 Claims, 5 Drawing Sheets

VORTEX FLOWMETER HAVING INJECTION CLEANING PORTS

FIELD

The present invention relates generally to vortex flowmeters and more particularly to vortex flowmeters that measure flow rate of fluids that may contain substances that may solidify or stick to the interior of the flowmeter or have properties that result in a harsh environment.

BACKGROUND

Flowmeters may measure the rate of flow of a fluid in a pipe or other pathway. The fluid may be, for example, a gas or a liquid, and may be compressible or incompressible. One type of flowmeter is a vortex flowmeter which measures parameters including, for example, flow rate based on the principle of vortex shedding. Vortex shedding refers to a natural process in which a fluid passing a bluff body (sometimes referred to as a shedder) causes a boundary layer of slowly moving fluid to be formed along the surface of the bluff body. A low pressure area is created behind the bluff body and causes the boundary layer to roll up, which generates vortices in succession on opposite sides of the bluff body. The vortices induce pressure variations that may be sensed by a pressure sensor. The vortex-shedding pressure variations have a frequency that is related to the flow rate. Accordingly, by measuring the frequency of the pressure variations, the flow rate may be determined.

Vortex flowmeters provide vortex frequency data that can be used in conjunction with flow calibration factors to determine the velocity and volumetric flow rate of the fluid passing through the meter. With inputted fluid density values, the mass flow rate can also be computed. These measurements, and others, can be transmitted to a control room or other receiver over a communication line, such as, for example, a standard two-wire 4-20 milliamp ("mA") transmission line.

In some applications (e.g., in the petroleum, mining, chemical, and waste industries), the fluid flow monitored by a vortex flowmeter may sometimes include paraffin or other low-temperature melting point hydrocarbons, bentonite or other clays, lipids, or other similar materials that can form deposits in certain conditions.

The present inventors have developed systems and methods, described in detail below, that improve the ability operate a vortex flowmeter with fluids that contain materials that may form deposits on components of the flowmeter.

SUMMARY

One aspect of the invention is a vortex flowmeter for measuring a flow rate of a fluid. The vortex flowmeter includes a flowtube and a bluff body positioned in the flowtube for shedding vortices in the fluid when the fluid flows through the flowtube. A sensor positioned to detect the vortices. The vortex flowmeter has a cleaning port positioned to allow a stream of fluid to be directed into the flowtube through the cleaning port toward the sensor for cleaning material away from the sensor.

Another aspect of the invention is a method of cleaning a vortex flowmeter of the type having a flowtube for containing flow of a fluid, a bluff body for generating vortices in a fluid as the fluid flowing through the flowtube, and a sensor adapted to detect the vortices. The method includes injecting a fluid into the vortex flowmeter toward the sensor through a cleaning port.

Other objects and features will in part be apparent and in part pointed out hereinafter.

BRIEF DESCRIPTION OF THE DRAWINGS

Corresponding reference characters indicate corresponding parts throughout the drawings.

DETAILED DESCRIPTION

Figure 1:
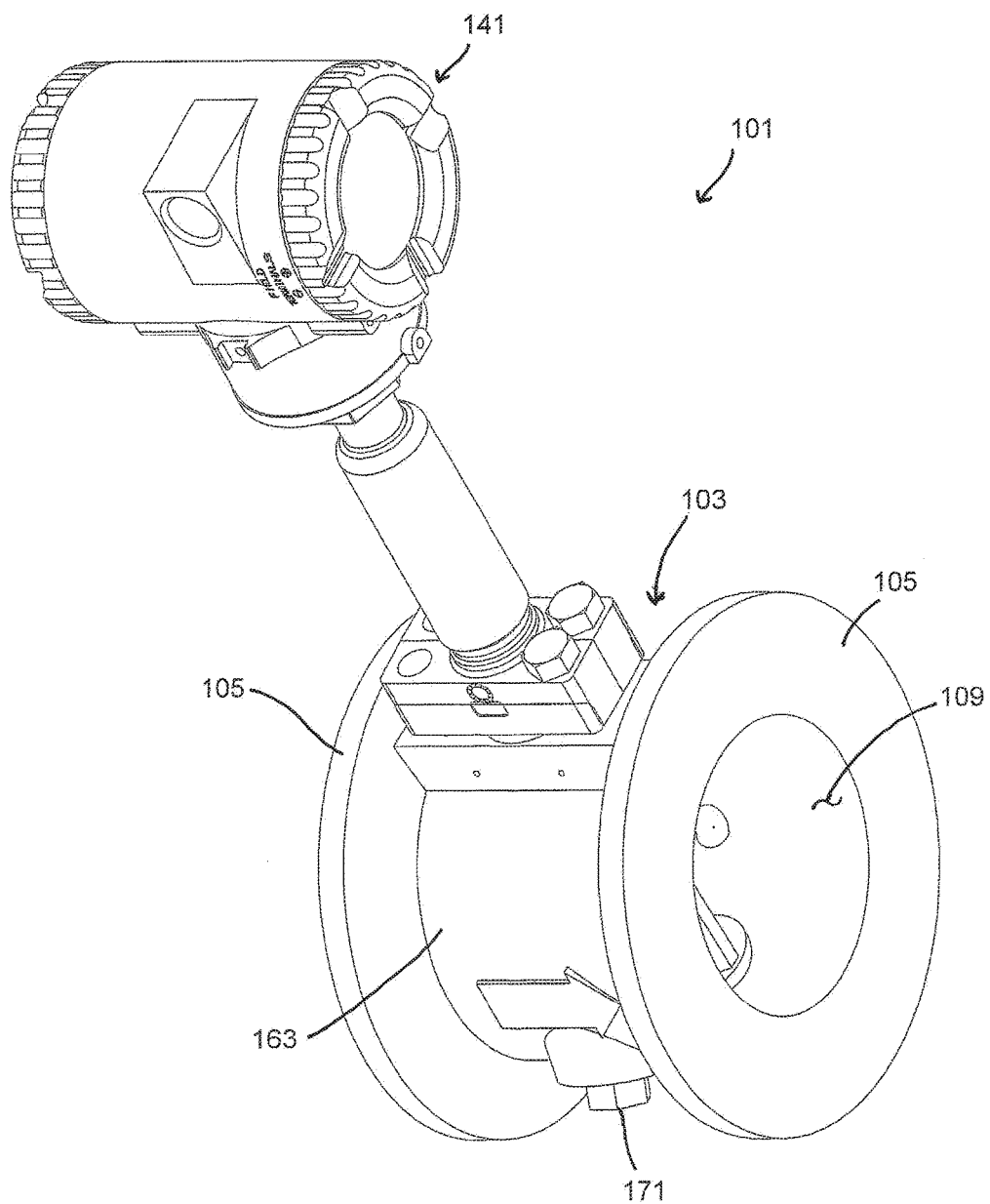
FIG. 1 is a perspective of one embodiment of a vortex flowmeter of the present invention.

Referring now to the drawings, first to FIG. 1, one embodiment of a vortex flowmeter for measuring fluid flow rate is generally designated 101. The vortex flowmeter 101 includes a flowtube 103 through which a fluid can flow. The flowtube 103 is suitably configured for installation in a fluid flow line (not shown). For example, process connections 105 are on the opposite ends of the flowtube 103 for connecting the inlet 107 and outlet 109 of the flowtube to the ends of pipes in a pipeline. The process connections 105 in FIG. 1 are so-called wafer connections (or "sandwich connections"). It is also common in the industry to use flanges as process connections. It is understood the process connections can be adapted for a wafer connection, a flange connection, threaded connections, NPT connections, or any other type of connection if desired without departing from the scope of the invention.

Figure 2:
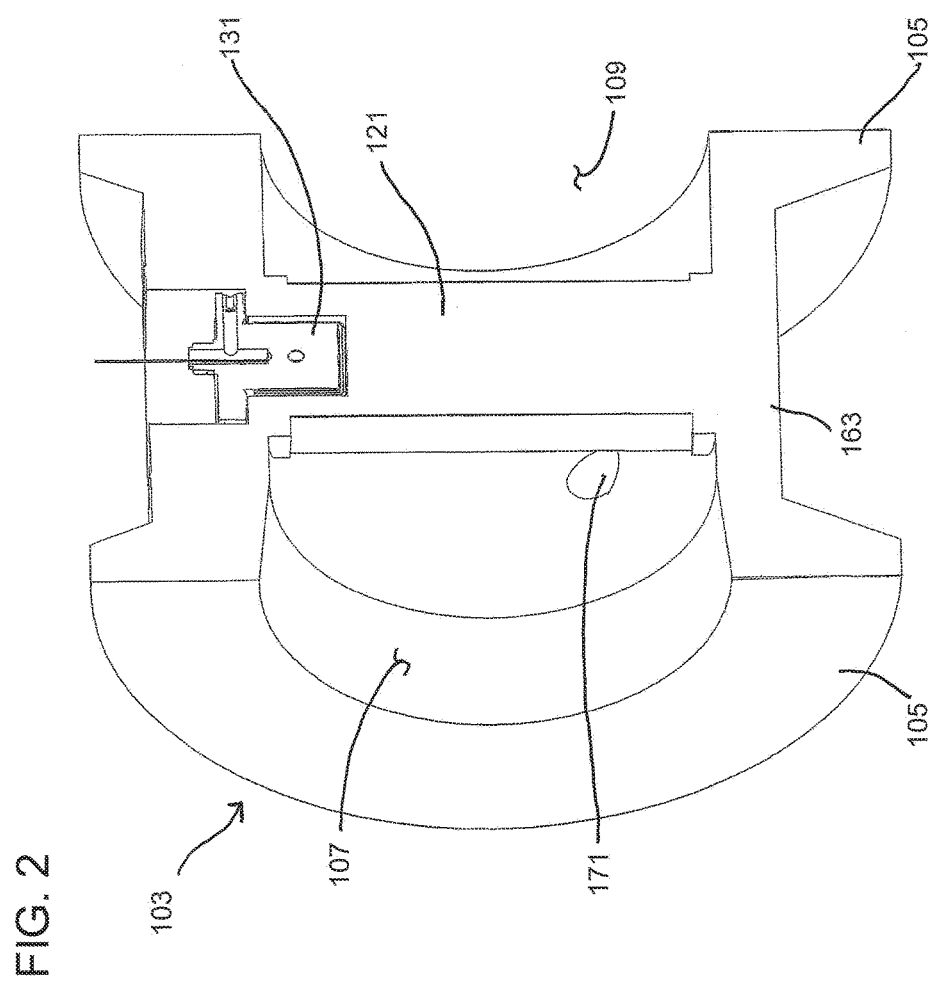
FIG. 2 is a perspective of a cross section of one embodiment of the flowtube taken in a vertical plane containing a central axis of the flowtube showing.

As shown in FIG. 2, a bluff body 121 (sometimes referred to in the industry as a vortex shedder or shedder bar) is positioned in the flowtube 103. The bluff body 121 is a structure that is positioned in the fluid flow 103 so it extends through the flowtube 103 for the purpose of generating vortices in the fluid when the fluid flows through the flowtube. Those skilled in the art recognize that the size and shape of the bluff body can vary widely. Broadly speaking, the bluff body can have any configuration as long as it is able to generate vortices in a fluid stream flowing past the bluff body. The frequency of the vortices is proportional to the velocity of the fluid for a relatively wide range of flow conditions. Assuming the cross sectional flow area of the flowtube 103 is constant, the frequency of vortices is also proportional to the volumetric flow rate. This phenomenon is well known to those skilled in the art and need not be discussed in detail. Moreover, if the density of the fluid is known or measured, the mass flow rate can be derived from the volumetric flow rate.

Figure 3:
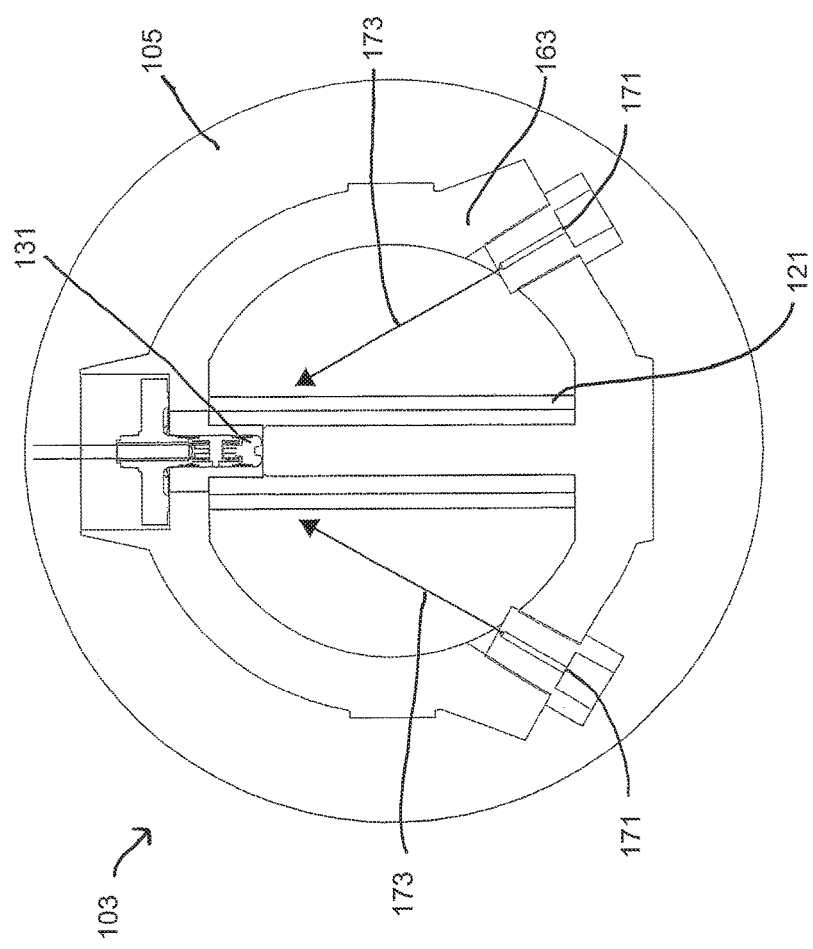
FIG. 3 is a cross section of the flowtube in FIG. 2 taken in a vertical plane that is perpendicular to the axis of the flowtube.

Referring to FIGS. 2 and 3, the vortex flowmeter 101 includes a sensor 131 positioned to detect vortices generated by the bluff body 121. As illustrated, the sensor 131 is suitably positioned at the top of the bluff body 121. In this embodiment, the sensor 131 is in direct contact with fluid flowing through the flowtube 103. This allows the sensor 131 to sense vortices directly. However, it is contemplated that the sensor can be positioned to sense vortices indirectly, such as by detecting movement of the bluff body or other structure that is designed to flex or otherwise move in response to pressure fluctuations associated with the vortices formed in the fluid. In the illustrated embodiment, the sensor 131 is a differential pressure sensor that uses piezoelectric transducers to sense vortices and that is mounted in the bluff body 121 so that the sensor is exposed to fluid on both side of the bluff body. It is understood that the sensor can be positioned elsewhere within the scope of the invention, such as downstream of the bluff body or in a well formed in the flowtube above or below the bluff body. It is also understood that any type of sensor that is able to detect the vortices formed by the bluff body can be used.

The vortex flowmeter 101 includes a transmitter 141 (FIG. 1) that receives signals from the sensor 131 indicative of the frequency of vortex formation. The transmitter 141 includes one or more microprocessors or circuitry (not shown) configured to output a measurement signal indicative of fluid flow rate through the flowtube 103 based on the signals from the sensor 131. The transmitter can be analog or digital. For example, the transmitter 141 can be configured to communicate with a distributed control system (not shown) using protocols such as, but not limited to, 4-20 mA output, HART, Foundation Fieldbus, and Modbus.

The fluid carried by the pipeline may be a liquid, a gas, or a mixture of liquid and gas. The fluid may also contain materials that have the capability of forming deposits under certain conditions, such as paraffin, lipids, etc. These deposits can result in build-up and fouling. Vortex flowmeters have the advantage of no moving parts and are therefore considered relatively resistant to the effects of fouling compared to some other type of flowmeters. However, the build-up of deposits can interfere with optimal operation of a vortex flowmeter. In some cases, accumulation of material in or around the sensor can interfere with operation of the flowmeter by altering the effective cross sectional area through which fluid flows, hence producing a higher measured flow rate from the vortex sensor due to higher flow velocities associated with constriction of the fluid flow by the accumulated material. For another example, in the case of the type of sensor 131 in the illustrated embodiment, which relies on detection of pressure fluctuations in the fluid, accumulation of material in and around the sensor may affect operation of the sensor. Other types of sensors can also be impaired by accumulation of material on or in the vicinity of the sensor.

Referring to FIGS. 2 and 3, the vortex flowmeter 101 includes one or more cleaning ports 171 adapted to allow a stream 173 of fluid to be directed into the flowtube 103 through the cleaning port(s) toward the sensor 131 for cleaning material away from the sensor. The material to be removed can be accumulated debris, accumulated buildup of wax, paraffin or other fouling material, or a combination thereof. Although it is contemplated that a single cleaning port is within the scope of the invention, it may be preferable to include multiple cleaning ports 171. The embodiment illustrated in the drawings includes a pair of substantially identical cleaning ports 171 positioned on opposite sides of the bluff body 121. As illustrated, each of the cleaning ports 171 is suitably configured to extend through the wall 163 of the flowtube 103. Each of the cleaning ports 171 is suitably angled so fluid exiting the port is directed generally toward the sensor 131.

In the embodiment illustrated in FIGS. 1-3, the cleaning ports 171 are each located in the lower half of the flowtube 103. The cleaning ports 171 are also offset laterally from the bluff body 121. It is possible for cleaning ports to be located in the upper portion of the flowtube without departing from the scope of the invention (e.g., as in the embodiments illustrated in FIGS. 4 and 5 and described in more detail below). However, cleaning ports 171 located in the lower portion of the flowtube 103 can facilitate removal of accumulated material from the sensor 131 when the sensor is in the upper part of the flowtube because the resulting upward orientations of the fluid streams 173 can create a swirling washing action at the sensor that allows for loosening of the material and also provides an exit for the material to be washed away from the sensor after the material has been loosened. It can also be desirable for the cleaning ports 171 to be in the lower portion of the flowtube 103 while the transmitter 141 is mounted on the upper portion of the flowtube because this may provide easier physical access to the cleaning ports 171 by workers from outside the flowtube 103 with less physical interface from the transmitter.

In the embodiment of FIGS. 1-3, each cleaning port 171 is offset laterally from the bluff body 121. The cleaning port 171 is also positioned at about the same position axially along the flow tube 103 as the sensor 131. The cleaning ports 171 are also positioned on opposite sides of the sensor 131 so that one cleaning port is positioned to remove material from one side of the sensor and the other cleaning port is positioned to remove material from the other side of the sensor.

Various different structures can be included in or added to the flowtube 103 to constitute a cleaning port 171. For example, the cleaning ports 171 suitably include an external connector, such as a threaded NPT connector (e.g., ¼" or ⅛"), a fluid passage extending through the connector and into the flowtube 103, and an internal sealing mechanism. For example, the cleaning port suitably includes a quick-connect NPT port and an internal valve (e.g., built into the connector). For another example, an external NPT connector may be used in combination with a fluid passage that has no valve or seal. In this example, a block and bleed valve or other flow control structure is suitably connected to the external side of the NPT connector to control flow through the cleaning port. Cleaning ports can also include other types of connectors including any standard connectors/fittings that may be desired. The cleaning ports 171, or portions thereof, can be cast as one-piece with the flowtube 103, machined to be part of the flowtube, and/or welded as permanent inserts to the flowtube.

The operation of the flowmeter 101 is substantially identical to a conventional vortex flowmeter except as noted. At any time fluid can be injected into the meter 101 through one or more of the cleaning ports 171 to remove unwanted material from the sensor 131 and/or the vicinity of the sensor. For example, fluid (e.g., water or other suitable cleaning fluid) may be injected into the flowmeter 101 and directed toward the sensor 131. Some of the fluid may be directed toward one side of the sensor 131 by one of the cleaning ports 171 while some of the fluid is directed toward an opposite side of the sensor by the other cleaning port to facilitate removal of unwanted material from both sides of the sensor. Optionally, the fluid may be heated before being injecting through the cleaning ports 171 to facilitate removal of deposited material.

In some cases, it may be desirable to interrupt use of the meter 101 to facilitate use of the cleaning ports 171 to clear unwanted material away from the sensor 131. For example, the meter 101 may be emptied of liquid so water or other cleaning liquid can flow directly from the cleaning ports 171 to the vicinity of the sensor 131 without traveling through any other liquid to get there. Alternatively, it may be possible in some cases to clean unwanted materials from the sensor 131 while the flowtube 103 is filled with liquid by using the cleaning ports to create turbulence in the liquid using a higher pressure liquid injected through the cleaning ports 171. In either case, the cleaning ports 171 can advantageously be used to clear unwanted materials from the sensor 131 without disconnecting the flowtube 103 from the fluid pipeline. If the meter 101 is being used to measure flow rate of a gas, air, nitrogen, or another suitable gas can be injected into the flowtube 103 through the cleaning ports 171 instead of a liquid to remove material from the vicinity of the sensor 131. For example, gas can be pressurized to a pressure that is above the pressure of the process fluid and injected through the cleaning ports 171.

The use of the cleaning ports 171 to clean the flowmeter 101 can be part of regularly scheduled maintenance to ensure the flowmeter is operating more optimally and/or the cleaning ports can be used as part of a corrective action in response to detected impairment of the flowmeter.

Figure 4:
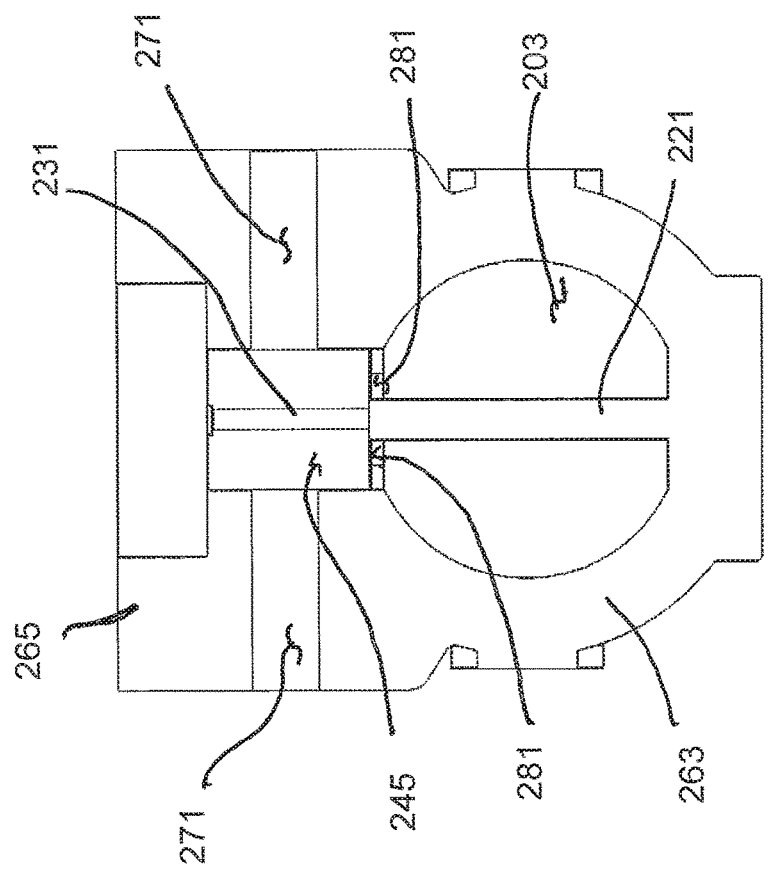
FIG. 4 is a cross section of the flowtube of another embodiment of a vortex flowmeter taken in a vertical plane that is perpendicular to the axis of the flowtube.

FIG. 4 illustrates another embodiment of a vortex flowmeter having cleaning ports. The construction and use of the vortex flowmeter in FIG. 4 is substantially similar to the vortex flowmeter 101 described above and illustrated in FIGS. 1-3, except as noted. One difference is that the sensor 231 for detecting vortices in this embodiment is located in a cavity 245 positioned above the bluff body 221. The cavity 245 is suitably formed in a flowtube block 265 (broadly a housing) formed integrally with the flowtube wall 263. Passages 281 on either side of the bluff body 221 provide fluid communication between the flowtube 203 and the sensor 231. In this embodiment, a pair of cleaning ports 271 extend through the flowtube block 265 on opposite sides of the sensor 231. The cleaning ports 271 are positioned and arranged so that a cleaning fluid may be injected into the cavity 245 to remove material from the sensor 231. Also, in some environments one or more of the passages 281 can become plugged with wax and/or debris. To prevent this, or to unplug the passages 281, the cleaning ports 271 can be used to periodically pressurize the cavity 245 (e.g., during runtime) to a pressure that is higher than a pressure in the flowtube 203 to push any plugs that may have formed, or may be forming, in the passages 281 out into the fluid flowing through the flowtube 203 and down the pipeline. For example, the cleaning ports 271 can suitably be connected to a pressure source (not shown) having a pressure selected to be slightly higher than the pressure in the pipeline and flowtube 203 (e.g., about 10 psi higher). For instance a pressure equalizing 3-way valve can be used to equalize the injected pressure on the opposite sides of the sensor 231. One or more check valves is suitably used to prevent backflow of process fluid during the injection.

Figure 5:
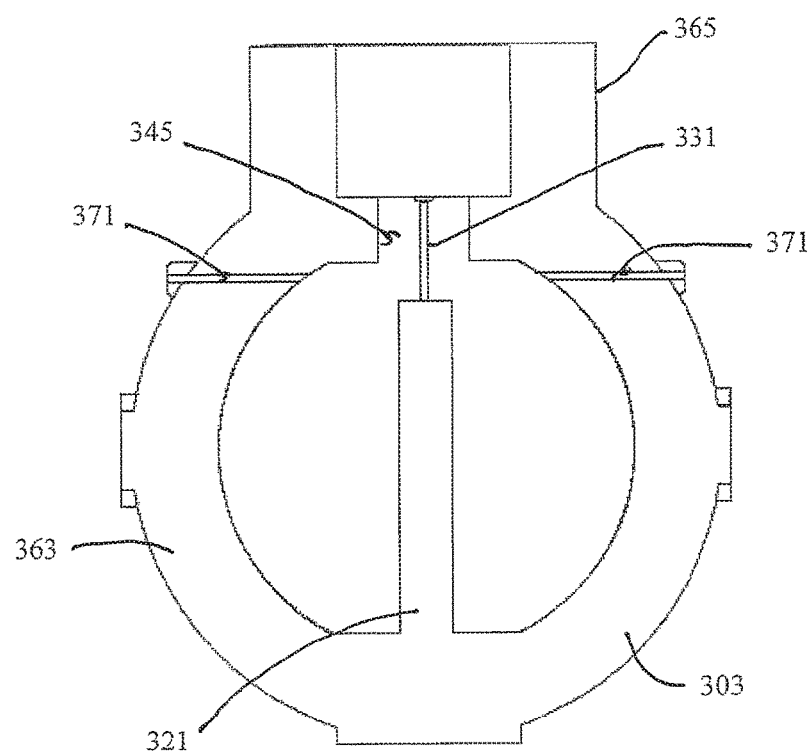
FIG. 5 is a cross section of the flowtube of yet another embodiment of vortex flowmeter taken in a vertical plane that is perpendicular to the axis of the flowtube.

FIG. 5 illustrates yet another embodiment of a vortex flowmeter having cleaning ports. The construction and use of the vortex flowmeter in FIG. 5 is substantially similar to the vortex flowmeter 101 described above and illustrated in FIGS. 1-3, except as noted. In this embodiment, the sensor 331 is positioned above the bluff body 321 and extends partially into a cavity 345 formed in the flowtube block 365 that is formed integrally with the flowtube wall 363. In contrast with the embodiment illustrated in FIG. 4, the cavity 345 in the embodiment in FIG. 5 does not extend far enough into the flowtube block 365 to allow the entire sensor 331 to fit in the cavity. Instead, a portion of the sensor 331 is in the cavity 345 and a portion of the sensor extends from the cavity into the flowtube 303. A pair of cleaning ports 371 extend through the flowtube wall 303 on opposite sides of the sensor 331 and bluff body 321. As illustrated in FIG. 5, the cleaning ports 371 are each suitably positioned and arranged to direct a stream of cleaning fluid (not shown) toward the sensor 331 to clear material away from the sensor. For example, the cleaning ports 371 are suitably positioned and oriented to direct a jet of cleaning fluid from the cleaning ports toward the part of the sensor that extends into the flowtube 303. The cleaning ports 271 are suitably oriented so the cleaning fluid is directed along a path that is substantially orthogonal to the major surfaces of the sensor 331. For example, in FIG. 5 the cleaning ports 371 extend angularly through the flowtube wall 363. If desired, the body (often a casting) for the flowtube 303 is suitably modified at the inlet of the cleaning port(s) 371 (e.g., to include a protrusion or pad) to square off the end of the cleaning port inlet and facilitate use of a fitting having a higher pressure safety rating, as illustrated in FIG. 5.

When introducing elements of the present invention of the preferred embodiments thereof, the articles "a", "an", "the", and "said" are intended to mean that there are one or more of the elements. The terms "comprising", "including", and "having" are intended to be inclusive and mean that there may be additional elements other than the listed elements.

In view of the foregoing, it will be seen that the several objects of the invention are achieved and other advantageous results attained.

As various changes could be made in the above constructions without departing from the scope of the invention, it is intended that all matter contained in the above description and shown in the accompanying drawings shall be interpreted as illustrative and not in a limiting sense.

The invention claimed is:

1. A vortex flowmeter for measuring a flow rate of a fluid, the vortex flowmeter comprising:
   a flowtube;
   a bluff body positioned in the flowtube for shedding vortices in the fluid when the fluid flows through the flowtube;
   a sensor positioned to detect the vortices; and
   a cleaning port positioned to allow a stream of fluid to be directed into the flowtube through the cleaning port toward the sensor for cleaning material away from the sensor.

2. A vortex flowmeter as set forth in claim 1 wherein the cleaning port is positioned in the wall of the flowtube and offset laterally from the bluff body.

3. A vortex flowmeter as set forth in claim 2 wherein the cleaning port is angled toward the sensor.

4. A vortex flowmeter as set forth in claim 3 wherein the cleaning port is a first cleaning port, the vortex flowmeter having a second cleaning port adapted to allow a stream of fluid to be directed into the flowtube through the cleaning port toward the sensor for cleaning material away from the sensor, the first and second cleaning ports being on opposite sides of the bluff body and angled toward the sensor.

5. A vortex flowmeter as set forth in claim 2 wherein the cleaning port in positioned in a lower portion of the flowtube.

6. A vortex flowmeter as set forth in claim 5 further comprising a transmitter configured for outputting a fluid flow rate measurement derived from the sensor, the transmitter being mounted on an upper portion of the flowtube.

7. A vortex flowmeter as set forth in claim 1 wherein the sensor is a differential pressure sensor.

8. A vortex flowmeter as set forth in claim 1 wherein the sensor is positioned to make direct contact with fluid flowing through the flowtube.

9. A vortex flowmeter as set forth in claim 1 wherein the sensor is a differential pressure sensor positioned to make direct contact with fluid flowing through the flowtube on opposite sides of the sensor.

10. A vortex flowmeter as set forth in claim 1 wherein the sensor is positioned in a cavity formed at one end of the bluff body and the cleaning port is positioned to direct fluid into the cavity.

11. A vortex flowmeter as set forth in claim 10 wherein the cavity is in fluid communication with the flowtube through a passage and the cleaning port is configured to pressure in the cavity to be increased to a pressure that is higher than a pressure in the flowtube to cause material to flow from the cavity to the flowtube through the passage.

12. A method of cleaning a vortex flowmeter of the type having a flowtube for containing flow of a fluid, a bluff body for generating vortices in a fluid as the fluid flowing through the flowtube, and a sensor adapted to detect the vortices, the method comprising injecting a fluid into the vortex flowmeter toward the sensor through a cleaning port.

13. A method as set forth in claim 12 wherein the injecting comprises injecting the fluid into the vortex flowmeter toward the sensor through a plurality of cleaning ports.

14. A method as set forth in claim 13 wherein injecting the fluid into the vortex flowmeter comprises simultaneously directing fluid streams from the cleaning ports toward opposite sides of the sensor.

15. A method as set forth in claim 12 wherein the flowtube is connected at opposite ends to a fluid pipeline and the injecting comprises injecting fluid into the vortex flowmeter through the cleaning port without disconnecting the flowtube from the fluid pipeline.

16. A method as set forth in claim 12 wherein the method comprises injecting the fluid through a cleaning port that is positioned to extend through a wall of the flowtube.

17. A method as set forth in claim 12 wherein the fluid injected into the flowtube comprises a liquid.

18. A method as set forth in claim 12 wherein the fluid injected into the flowtube comprises a gas.

19. A method as set forth in claim 12 wherein the injecting is performed without stopping the fluid flowing through the flowtube.

20. A method as set forth in claim 12 wherein the sensor is positioned in a cavity fluidly connected to the flowtube by a passage and injecting a fluid into the vortex flowmeter comprises injecting the fluid into the cavity to cause material to flow from the cavity to the flowtube through the passage.

* * * * *